United States Patent
Grandhi et al.

(10) Patent No.: US 9,036,476 B2
(45) Date of Patent: May 19, 2015

(54) MAINTAINING LOAD BALANCING AFTER SERVICE APPLICATION WITH A NETWORK DEVICE

(71) Applicant: Juniper Networks, Inc., Sunnyvale, CA (US)

(72) Inventors: Jagadish Grandhi, Hyderbad (IN); Gopi Krishna, Tracy, CA (US); Ananda Sathyanarayana, Santa Clara, CA (US); Arun Balasubramanian, San Francisco, CA (US); Bobby Vandalore, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 119 days.

(21) Appl. No.: 13/630,458

(22) Filed: Sep. 28, 2012

(65) Prior Publication Data

US 2014/0092738 A1    Apr. 3, 2014

(51) Int. Cl.
*H04L 12/803*  (2013.01)
*H04L 12/707*  (2013.01)
(Continued)

(52) U.S. Cl.
CPC .............. *H04L 45/22* (2013.01); *H04L 45/50* (2013.01); *H04L 47/52* (2013.01); *H04L 47/125* (2013.01); *H04L 47/14* (2013.01); *H04L 47/724* (2013.01); *H04L 47/824* (2013.01); *H04L 45/24* (2013.01)

(58) Field of Classification Search
CPC ..... H04L 67/1002; H04L 47/10; H04L 47/25; H04L 47/2441; H04L 47/2483; H04L 45/50; H04L 41/50

USPC ......... 370/216, 217, 218, 221, 229, 235, 237, 370/351, 389, 392, 395.3, 395.31, 395.32, 370/400, 408
See application file for complete search history.

(56) References Cited

U.S. PATENT DOCUMENTS

| | | |
|---|---|---|
| 6,847,645 B1 | 1/2005 | Potter et al. |
| 6,976,154 B1 | 12/2005 | Dyckerhoff et al. |

(Continued)

FOREIGN PATENT DOCUMENTS

| | | |
|---|---|---|
| EP | 1793542 A2 | 11/2006 |
| EP | 1892905 A1 | 8/2007 |

OTHER PUBLICATIONS

IEEE Draft Standard 802.1ag, "Virtual Bridged Local Area Networks—Amendment 5: Connectivity Fault Management," LAN MAN Standards Committee, Dec. 17, 2007, 259 pp.

(Continued)

*Primary Examiner* — Curtis A Alia
(74) *Attorney, Agent, or Firm* — Shumaker & Sieffert, P.A.

(57) ABSTRACT

In general, techniques are described for maintaining load balancing after service application. A network device comprising ingress and egress forwarding components and a service card may implement the techniques. An ingress forwarding component receives a packet and, in response to a determination that the service is to be applied to the packet, updates the packet to include an ingress identifier that identifies the ingress forwarding component, thereafter transmitting the updated packet to the service card. The service card applies the service to the updated packet to generate a serviced packet and transmits the serviced packet to the ingress forwarding component identified by the ingress identifier so as to maintain load balancing of packet flows across the plurality of forwarding components. The ingress forwarding component determines a next hop to which to forward the serviced packet and the egress forwarding component forwards the serviced packet to the determined next hop.

25 Claims, 6 Drawing Sheets

(51) Int. Cl.
*H04L 12/723* (2013.01)
*H04L 12/873* (2013.01)
*H04L 12/913* (2013.01)
*H04L 12/801* (2013.01)
*H04L 12/911* (2013.01)

(56) References Cited

U.S. PATENT DOCUMENTS

| | | |
|---|---|---|
| 7,184,437 B1 | 2/2007 | Cole et al. |
| 7,299,296 B1 | 11/2007 | Lo et al. |
| 7,447,149 B1 | 11/2008 | Beesley et al. |
| 7,606,154 B1 | 10/2009 | Lee |
| 7,647,425 B2 * | 1/2010 | Charzinski et al. ............ 709/239 |
| 7,716,725 B2 * | 5/2010 | Xie .................................. 726/11 |
| 7,936,770 B1 | 5/2011 | Frattura et al. |
| 7,948,986 B1 * | 5/2011 | Ghosh et al. ................... 370/392 |
| 8,077,726 B1 | 12/2011 | Kumar et al. |
| 8,339,959 B1 | 12/2012 | Moisand et al. |
| 8,369,345 B1 | 2/2013 | Raghunathan et al. |
| 2003/0099218 A1 | 5/2003 | Tillotson |
| 2003/0193955 A1 | 10/2003 | Beshai |
| 2004/0210663 A1 * | 10/2004 | Phillips et al. ................ 709/230 |
| 2005/0198371 A1 | 9/2005 | Smith et al. |
| 2006/0126496 A1 | 6/2006 | Filsfils et al. |
| 2008/0044181 A1 | 2/2008 | Sindhu |
| 2008/0291928 A1 | 11/2008 | Tadimeti et al. |
| 2009/0252033 A1 | 10/2009 | Ramakrishnan et al. |
| 2010/0296517 A1 | 11/2010 | Kompella |

OTHER PUBLICATIONS

Katz, et al., "Bidirectional Forwarding Detection (BFD)" Internet Engineering Task Force (IETF), RFC 5880, Jun. 2010, 49 pp.
Pan, et al., "Fast Reroute Extensions to RSVP-TE for LSP Tunnels," Network Working Group, RFC 4090, May 2005, 36 pp.
IEEE Std. 802.3ah-2004, "Part 3: Carrier Sense Multiple Access with Collision Detection (CSMA/CD) Access Method and Physical Layer Specifications Amendment: Media Access Control Parameters, Physical Layers and Management Parameters for Subscriber Access Networks," Sep. 7, 2004, 640 pp.
U.S. Appl. No. 10/045,717 by Kompella, filed Oct. 19, 2001.
U.S. Appl. No. 13/340,182 by Strahle,et al., filed Dec. 29, 2011.
U.S. Appl. No. 13/952,223 by Rustagi et al., filed Jul. 26, 2013.
Extended European Search Report mailed Nov. 15, 2013 in corresponding EP Application No. 13186282.3, 8 pgs.
Awduche et al. "RSVP-TE: Extensions to RSVP for LSP Tunnels", RFC 3209, Network Working Group, The Internet Society, Dec. 2001, 62 pgs.
Rosen et al. "Multiprotocol Label Switching Architecture" RFC 3031, Network Working Group, The Internet Society, Jan. 2001, 62 pgs.
Zimmerman, Hubert "OSI Reference Model—The ISO Model of Architecture for Open Systems Interconnection", IEEE Transactions on Communications, vol. Com-28, No. 4, Apr. 1980, 8 pgs.
Atlas et al. U.S. Appl. No. 13/536,487, filed Jun. 28, 2012 entitled Path Weighted Equal-Cost Multipath.
Moisand et al. U.S. Appl. No. 61/054,692, filed May 20, 2008 entitled Streamlined Packet Forwarding Using Dynamic Filters for Routing and Security in a Shared Forwarding Plane.
Raghunathan et al. U.S. Appl. No. 12/618,536, filed Nov. 13, 2009 entitled Multi-Router System Having Shared Network Interfaces.
Rustagi et al. U.S. Appl. No. 13/162,157, filed Jun. 16, 2011 entitled "Active-Active Multi-Homing With Multi-Chassis Pseudowire Link Aggregation".
IEEE Std. 802.3ad-2000, "Amendment to Carrier Sense Multiple Access with Collision Detection (CSMA/CD) Access Method and Physical Layer Specifications—Aggregation of Multiple Link Segments", 2000,183 pgs.
Response filed Sep. 30, 2014 to the Communication Pursuant to Rule 69 EPC mailed Apr. 7, 2014 in corresponding EP Application No. 13186282.3, 16 pgs.
Examination Report from counterpart European Patent Application No. 13186282.3, dated Nov. 25, 2014, 4 pp.
Response to Examination Report dated Nov. 25, 2014, from counterpart European Patent Application No. 13186282.3, filed Mar. 24, 2015, 12 pp.

* cited by examiner

MAINTAINING LOAD BALANCING AFTER SERVICE APPLICATION WITH A NETWORK DEVICE

TECHNICAL FIELD

This disclosure relates to computer networks and, more particularly, to load balancing within computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Network routers maintain routing information that describes available routes through the network. Upon receiving a packet, a router examines information within the packet and forwards the packet in accordance with the routing information. In order to maintain an accurate representation of the network, routers exchange routing information in accordance with one or more routing protocols, such as an interior gateway protocol (IGP) or Border Gateway Protocol (BGP).

In some instances, a router may implement a form of load balancing referred to as weighted equal cost multi-path (WECMP) to allocate packet flows across multiple paths through the network to the same destination device. That is, a computer network may provide for a number of paths between an ingress router and an egress router. The ingress router may select one of these paths for a particular packet flow and another path, which may be equal in terms of costs or other metrics, for another packet flow. In selecting these paths, the ingress router may attempt to distribute these packet flows across the paths so as to avoid over-allocating packet flows to any one path. This form of load balancing may be weighted in that the ingress router may assign weights to each of the paths and allocate the packet flows according to the assigned weights.

Routers may also implement services, such as security services, network address translation (NAT) services, tunneling services, firewall services, and the like. Typically, the ingress router applies the services by redirecting packet flows to one or more service cards included within the router to apply the service to packets of the packet flows prior to forwarding the packets of the flow to their intended destination. Application of these services may however disrupt packet forwarding in accordance with WECMP such that router does not perform proper load balancing to distribute the packets of the flows in accordance with the defined weights.

SUMMARY

In general, techniques are described for enabling a network device to perform load balancing of packet flows after application of one or more services to the packet flows. Rather than upgrade service cards to perform path selection or otherwise hash at least a portion of the packet to pseudo-randomly identify a forwarding component capable of performing path selection, an ingress forwarding component of the network device that receives a packet may mark, tag or otherwise update this packet to specify an ingress identifier that identifies the ingress forwarding component. As a result, the service card of the network device may, after applying one or more services to the received packet, transmit the serviced packet back to the forwarding component identified by the ingress identifier. This ingress forwarding component may be configured to properly apply weighted equal cost multi-path algorithms (WECMP) when determining a path of a number of paths (often of equal costs) along which to forward the serviced packet.

By potentially avoiding upgrading of service cards to perform this path selection, the techniques may promote cost savings. Additionally, by enabling service cards to forgo hashing of packets to pseudo-randomly identify forwarding components that are to act as ingress forwarding components for the packet but that are not configured to perform path selection in accordance with WECMP algorithms, the techniques may facilitate load balancing in accordance with WECMP. While described with respect to WECMP, the techniques may generally be performed with respect to any load balancing algorithms, such as those utilized in performing link aggregation and other forms of multi-path or multi-link load balancing.

In one aspect, a method comprises receiving a packet with a first one of a plurality of forwarding components included within a network device, wherein the first one of the plurality of forwarding components acts as an ingress forwarding component for a packet flow to which the received packet corresponds. The method further comprises determining, with the ingress forwarding component, that a service is to be applied to the packet, updating, with the ingress forwarding component, the packet to include an ingress identifier that identifies the ingress forwarding component in response to the determination that a service is to be applied to the packet and transmitting, with the ingress forwarding component, the updated packet to a service card that applies the service. The method also comprises applying, with the service card, the service to the updated packet to generate a serviced packet and transmitting, with the service card, the serviced packet to the ingress forwarding component identified by the ingress identifier so as to maintain load balancing of packet flows across the plurality of forwarding components. Additionally, the method comprises determining, with the ingress forwarding component, a next hop of a plurality of next hops to which to forward the serviced packet and forwarding, with a second one of the plurality of forwarding components, the serviced packet to the determined next hop, wherein the second one of the plurality of forwarding components acts as an egress forwarding component for a packet flow to which the serviced packet corresponds.

In another aspect, A network device comprises a plurality of forwarding components, wherein a first one of the plurality of forwarding components receives a packet and, acting as an ingress forwarding component for a packet flow to which the received packet corresponds, determines that a service is to be applied to the packet, updates the packet to include an ingress identifier that identifies the ingress forwarding component in response to the determination that the service is to be applied to the packet and transmits the updated packet to a service card that applies the service. The network device further comprises a service card that applies the service to the updated packet to generate a serviced packet and transmits the serviced packet to the ingress forwarding component identified by the ingress identifier so as to maintain load balancing of packet flows across the plurality of forwarding components. The ingress forwarding component determines a next hop of a plurality of next hops to which to forward the serviced packet. A second one of the plurality of forwarding components acts an egress forwarding component for a packet flow to which the service packet corresponds and forwards the serviced packet to the determined next hop.

In another aspect, a service card configured to be inserted into a network device and couple to a plurality of forwarding components of the network device comprises a control unit that receives a packet from a first one of the plurality of forwarding components acting as an ingress forwarding component for a packet flow to which the packet corresponds, wherein the packet includes an internal service packet header that includes a field specifying an ingress identifier that identifies the ingress forwarding component. The control unit executes a service engine that applies a service to the updated packet to generate a serviced packet. The control unit further transmits the serviced packet to the ingress forwarding component identified by the ingress identifier so as to maintain load balancing of packet flows across the plurality of forwarding components.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
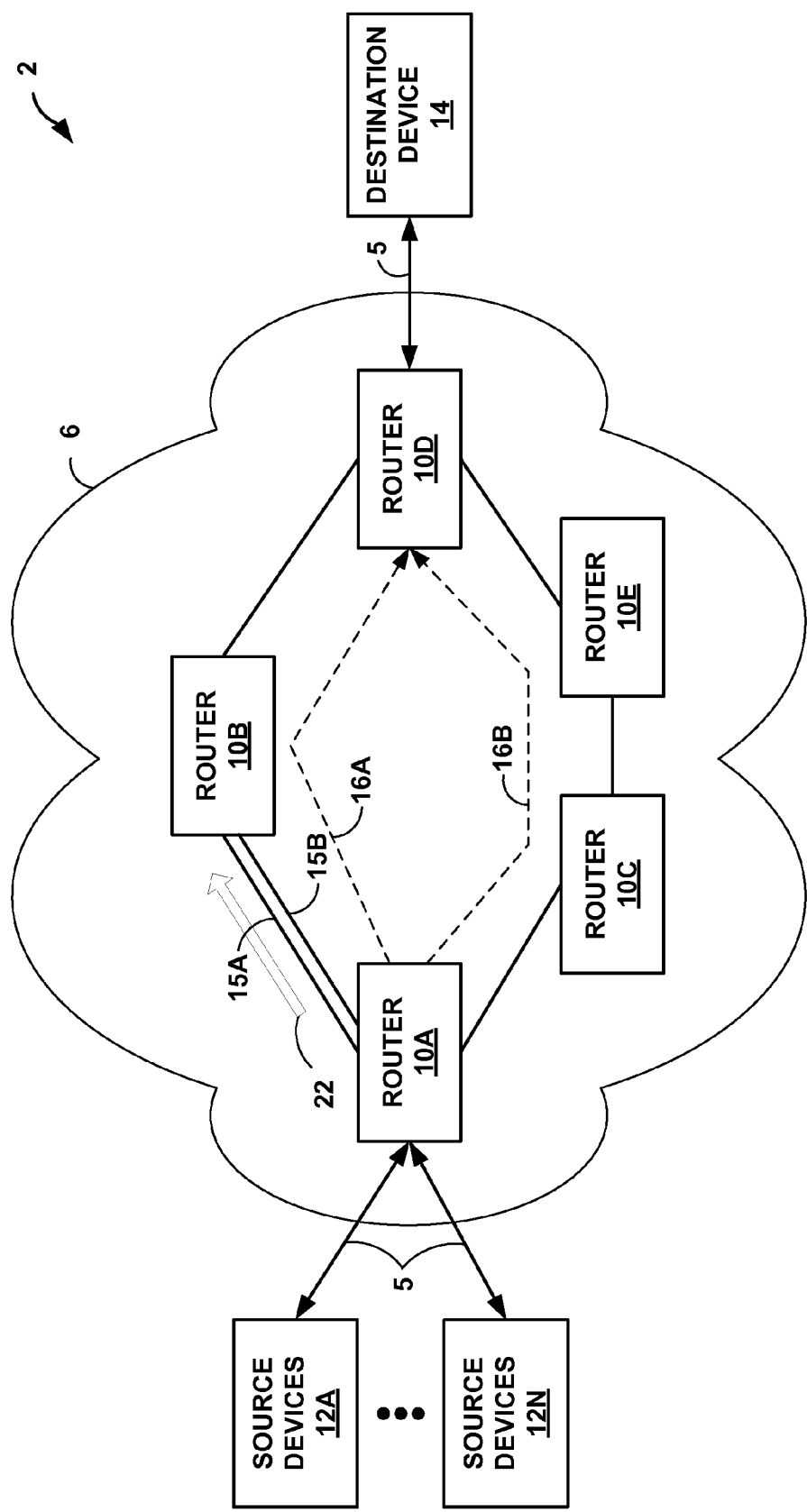
FIG. 1 is a block diagram illustrating an example network system that performs the post-service application load balancing in accordance with the techniques described in this disclosure.

FIG. 1 is a block diagram illustrating an example network system 2 that performs the post-service application load balancing in accordance with the techniques described in this disclosure. Network system 2 includes a network 6, which includes routers 10A-10E ("routers 10") that route network packets, received from source devices 12A-12N ("source devices 12"), toward destination device 14. Network 6 may comprise a public network, such as the Internet, a private network, such as those owned and operated by an enterprise or service provider, or a combination of both public and private networks. As a result, network 6 may be alternately referred to herein as a Service Provider (SP) network. Network 6 may include one or more Wide Area Networks (WANs), Local Area Networks (LANs), Virtual Local Area Networks (VLANs), Virtual Private Networks (VPNs), and/or another type of network.

In some instances, network 6 may be an Internet Protocol network in which routers 10 use IP forwarding for transporting network packets. In other instances, network 6 may be a label switching network in which network devices such as routers 10, often referred to as Label Switching Routers or LSRs, use Multi-Protocol Label Switching (MPLS) signaling protocols to establish Label Switched Paths (LSPs) for transporting the network packets received from source devices 12. The MPLS data-carrying mechanism of network 6 may be viewed as lying between layer 2 and layer 3 of the Open Systems Interconnection (OSI) model and is often referred to as a layer 2.5 protocol. Reference to layers followed by a numeral may refer to a particular layer of the OSI model. More information concerning the OSI model can be found in a IEEE publication entitled "OSI Reference Model—the ISO Model of Architecture for Open Systems Interconnection," by Hubert Zimmermann, published in IEEE Transactions on Communications, vol. 28, no. 4, dated April 1980, which is hereby incorporated by reference as if fully set forth herein. Further information regarding MPLS and the various features of MPLS, as well as, general architectural information regarding MPLS can be found in Request for Comments (RFC) 3031, titled "Multiprotocol Label Switching Architecture," prepared by the Network Working Group of the Internet Engineering Task Force (IETF), dated January 2001, incorporated by reference herein. In some instances, network 6 may offer Generalized MPLS (GMPLS). Although described herein in some instances with respect to MPLS, the techniques of this disclosure are also applicable to GMPLS.

Thus, although shown as a single network 6 in FIG. 1, network 6 may comprise any number of interconnected networks, either public or private, in which the various networks interconnect to form various virtual networks. In addition, network 6 may include a variety of other network devices for forwarding network traffic, such as additional routers, switches, or bridges. The particular configuration of network system 2 is merely an example, and routers 10 may reside in a single network or within multiple networks. Although described with respect to routers, aspects of the techniques are applicable to other network devices, such as bridges, switches, gateways, network caches, and network acceleration devices.

In the example of FIG. 1, network system 2 includes a number of source devices 12 and a destination device 14 coupled to an intermediate network 6. Each of source devices 12 and destination device 14 may be a personal computer, a laptop computer, a mobile telephone, a network telephone, a television set-top box, a network device integrated into a vehicle, a video game system, a point-of-sale device, a personal digital assistant, an intermediate network device, a network appliance, a supercomputer, a mainframe computer, or another type of device capable of interfacing with and communicating over network 6.

Source devices 12 and destination device 14 connect to network 6 via access links 5 that may comprise wired and/or wireless communication link. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), or wired Ethernet.

A number of physical and virtual communication links of network 6 interconnect routers 10 to facilitate control and data communication between the routers. Physical links of network 6 may include, for example, Ethernet PHY, Synchronous Optical Networking (SONET)/Synchronous Digital Hierarchy (SDH), Lambda, or other Layer 2 data links that include packet transport capability. Logical links of network 6 may include, for example, an Ethernet Virtual LAN, an MPLS LSP, or an MPLS-TE LSP.

Routers 10 employ one or more interior gateway protocols (IGPs) to determine link states/metrics for communication links within the interior of network 6. For example, router 10A may use an Open Shortest Path First (OSPF) or Intermediate System-Intermediate System (IS-IS) protocol to exchange routing information with routers 10B-10E. Router 10A stores the routing information to a routing information base that the router uses to compute optimal routes to destination addresses advertised within network 6.

In some instances, routers 10 support traffic engineering to improve the utilization of paths through network 6. In general, traffic engineering refers to operations to move traffic flow away from the shortest path computed by an interior gateway protocol for network 6 and toward a potentially less congested or otherwise more desirable (from an operational point of view) physical path across the network. For example, routers 10 may establish, using Resource Reservation Protocol with Traffic Engineering extensions (RSVP-TE) or another label distribution protocol (e.g., the Label Distribution Protocol (LDP)), one or more LSP tunnels that connect various pairs of routers 10 to route network traffic away from network failures, congestion, and bottlenecks. A router that comprises an interface to the LSP tunnel associates a metric with the LSP. An LSP metric may assume the metric of the underlying IP path over which the LSP operates or may be configured by an administrator of network 6 to a different value to influence routing decisions by routers 10. Routers 10 execute the interior gateway protocols to communicate via routing protocol messages and exchange metrics established for the LSP tunnels and store these metrics in a respective routing information base for use in computing optimal routes to destination addresses advertised within network 6. For example, routers 10 may advertise LSP tunnels as IGP links of network 6 using OSPF forwarding adjacencies (FAs). As used herein, therefore, the term "link" or "communication link" may also refer to an LSP operating over a layer 2 communication link.

RSVP-TE-established LSPs reserve resources using path state on routers 10 to ensure that such resources are available to facilitate a class of service (CoS) for network traffic forwarded using the LSPs. For example, router 10A may issue RSVP Path messages toward router 10D to establish an LSP and to reserve an amount of bandwidth for the LSP using path state on both router 10A and router 10B. Routers 10A, 10B must maintain the reserved amount of bandwidth for network traffic mapped to the LSP until the LSP is either preempted or torn down. RSVP-TE is described more fully in Awduche et al., "RSVP-TE: Extensions to RSVP for LSP Tunnels," Request for Comments 3209, Network Working Group, Internet Engineering Task Force, December, 2001, which is incorporated by reference as if fully set forth herein.

In some examples, routers 10 may additionally distribute detailed information about network loading using extensions to the IGPs. For example, routers 10 may execute IS-IS with traffic engineering extensions that use new type-length values (TLVs). As another example, routers 10 may execute OSPF with traffic engineering extensions using opaque link-state advertisements (LSAs) to distribute link attributes in link-state advertisements in addition to link-state and metrics. In some examples, routers 10 may advertise currently available bandwidth for the links of network 6, which takes into account traffic for which may otherwise be unaccounted. That is, routers 10 monitor and advertise currently available bandwidth for a link, expressed as a rate (e.g., MB/s), that takes into account bandwidth that is neither reserved via RSVP-TE nor currently in use to transport Internet Protocol (IP) packets or LDP packets over the link, where an LDP packet is a packet having an attached label distributed by LDP. Currently available bandwidth for a link is therefore neither reserved nor being used to transport traffic using unreserved resources. More information regarding this detailed information, the new TLVs, extensions to opaque LSAs and how routers may distribute this information is available in pending U.S. patent application Ser. No. 13/536,487, entitled "PATH WEIGHTED EQUAL-COST MULTIPATH," filed Jun. 28, 2012, the contents of which are hereby incorporated by reference in their entirety.

One or more of routers 10 may also implement one or more services, often including one or more service cards to perform the services. These services may include, as a few examples, a deep packet inspection service, a network address translation (NAT) service, a firewall service, a tunneling service, an anti-malware service, an anti-virus service, and an encryption service. Application of some of these services may impact path selection (or, in other words, forwarding decisions) performed by a packet forwarding component that originally received a packet. To illustrate, a NAT service generally involves replacing a source address and/or source port specified in an Internet protocol (IP) packet header of a packet with a different source address and/or source port. When performing WECMP, the router may utilize a so-called five-tuple that includes both the source port and the source address when attempting to distribute a packet flow to which the packet corresponds to two (often, equal cost) paths. Thus, a router that performs one or more services with respect to packets corresponding to flows that are also actively being load balanced across two or more paths and/or two or more links (such as in the example of aggregated links), the router must typically first forward the packet to a service card prior to performing path selection or forwarding decisions. Yet, service cards are typically not configured to perform path selection or make forwarding decisions. This lack of service card functionality may additionally impact path selection and affect load balancing of the packet flows across multiple paths and/or links.

To illustrate, assuming that router 10B applies one or more services to packets corresponding to a packet flow 22, which router 10A may receive from one of source devices 12A-12N. Router 10A may implement a load balancing algorithm, such as ECMP and/or WECMP, to specifically send this packet to router 10B via one of links 15A, 15B in order to maintain a balanced load across links 15A, 15B coupling router 10B to router 10A.

Router 10B may receive this packet, classify this packet as belonging to a flow to which both services and load balancing is to be performed. Router 10B may then determine that the packet is to be sent first to a service card included in router 10B, as router 10B is configured to first apply services given that one or more of the services may impact the forwarding decision. The service card of router 10B may then receive this packet and apply the service. As noted above, the service card may not however be configured or otherwise have the capability (e.g., the requisite hardware and/or software). The service card may then apply a hash function to at least a portion of this serviced packet (such as the above noted five-tuple that includes both the source address, source port in addition to a destination address, destination port and protocol) to identify in a pseudo-random manner a forwarding component capable of performing path selection. Yet, because this hash pseudo-randomly assigns this packet to one of the forwarding components, the service card cannot assure that the load remains balanced across the forwarding components in the manner previously ensured by router 10A when sending these packets to router 10B via links 15A, 15B.

That is, ECMP decision may have been performed by an external router, i.e., router 10A in this example, that is connected to router 10B via multiple links 15A, 15B. Route 10A may have used some algorithm to distribute the load among links 15A, 15B, such as WECMP. If the links fall on different forwarding components of the router, the traffic from different ingress forwarding components may be going to the service card. If the amount of traffic that is to be serviced by the service card is high, the service card may need to distribute the load among the available forwarding components. The service card may, to distribute this load, perform a hash on the packet content (such as the five-tuple) to distribute these packets among the forwarding components. Administrators may have, however, provisioned router 10A to perform load balancing among the links, which in turn distributes the load on the forwarding components of router 10B. When the service card hashes the packet to distribute them pseudo-randomly back to the forwarding components, the service card may inadvertently modify the load balancing provided via router 10A, resulting in load imbalances that do not adhere to the load balancing provided by router 10A. In this way, application of these services may disrupt packet forwarding in accordance with WECMP such that router 10A does not perform maintain proper load balancing.

In accordance with the techniques described in this disclosure, router 10B (or any other one of routers 10C-10E or any other type of network device) may maintain load balancing of packet flows after application of one or more services to the packet flows. Rather than upgrade service cards to perform path selection or otherwise hash at least a portion of the packet to pseudo-randomly identify a forwarding component capable of performing path selection, an ingress forwarding component of router 10B that receives a packet may mark, tag or otherwise update this packet to specify an ingress identifier that identifies the ingress forwarding component. As a result, the service card of router 10B may, after applying one or more services to the received packet, transmit the serviced packet back to the forwarding component identified by the ingress identifier so as to balance the load across the forwarding components in a manner consistent with that intended by the administrator when configuring WECMP in router 10A. By potentially avoiding upgrade of service cards to perform this path selection, the techniques may promote cost savings. Additionally, by enabling service cards to forgo hashing of packets to pseudo-randomly identify forwarding components that are to act as ingress forwarding components for the packet, the techniques may facilitate load balancing of traffic across the ingress forwarding components in a manner consistent with WECMP as performed by router 10A. While described with respect to WECMP, the techniques may generally be performed with respect to any load balancing algorithms, such as those utilized in performing link aggregation and other forms of multi-path or multi-link load balancing.

In operation, router 10B may receive a packet with a first one of a number of forwarding components. This first one of the forwarding components may act as what is referred to as an "ingress forwarding component" for a packet flow, i.e., packet flow 22 in the example of FIG. 1, to which the received packet corresponds. To act as an ingress forwarding component, this forwarding component may perform slow path processing to configure filters and other hardware logic so that packets corresponding to this flow 22 may be more quickly processed. This ingress forwarding component may install filters for flow 22 indicating that one or more services are to be applied to packets corresponding to this flow.

Router 10A may assign this flow 22 to link 15A using a load balance algorithm, such as WEMCP, which ensures proper load balancing. Proper load balancing may involve assigning flows to links, such as link 15A, 15B, in a manner that corresponds to configured weights assigned to each of these links 15A, 15B. For example, a weight of 40 may be assigned to link 15A and a weight of 60 may be assigned to link 15B, where the weight of 40 indicates that 40 percent of all flows within a load balancing subset of flows are to be assigned to link 15A while 60 percent of all flows in this load balancing subset of flows are to be assigned to link 15B. Router 10A may then maintain load balancing statistics to determine whether the actual distribution of flows to link 15A, 15B corresponds (usually within some defined threshold or percentage) to the weights assigned to the paths. In this way, router 10A effectively load balances flows across links 15A, 15B coupling router 10A to router 10B.

In any event, the ingress forwarding component of router 10B may determine that a service is to be applied to the packet. The ingress forwarding component may perform a lookup in a forwarding information base (FIB) using the five-tuple included in the IP header of the packet to determine that one or more services are to be applied to the packet. The FIB may represent a subset of the routing information base (RIB), where a control plane of router 10B may resolve the RIB to generate the FIB. This FIB typically includes entries associated with five-tuples (or a portion thereof) specifying so-called "next hops" to which the corresponding packet is to be forwarded. The FIB may also include internal next hops that identify service cards and/or other types of cards or components within router 10B to which the forwarding component is to forward the corresponding packet. The FIB may also be configured with chains of next hops specifying first an internal component (such as a service card) followed by a next hop identifying another network device, such as router 10D.

After identifying or otherwise determining that a service is to be applied to the packet, the ingress forwarding component of router 10B may then update the packet to include an ingress identifier that identifies the ingress forwarding component in response to the determination that a service is to be applied to the packet. This ingress identifier may also be referred to as an ingress forwarding component identifier. The ingress forwarding component may set this identifier to directly identify the ingress forwarding component or may specify this identifier such that this identifier may be used in conjunction with a table or other data structure to resolve a virtual identifier assigned to the ingress forwarding component. Often, virtual identifiers are assigned and used to switch between various packet forwarding component, where this virtual identifier identifies a slot or other coupling mechanism in which the ingress forwarding component is inserted.

Once the packet is updated with the ingress identifier, the ingress forwarding component transmits the updated packet to a service card that applies the service. The service card then applies the service to the updated packet to generate a serviced packet and transmits the serviced packet to the ingress forwarding component identified by the ingress identifier. Thus, rather than perform a hash on the five-tuple of the packet to pseudo-randomly assign this packet to any given one of the forwarding components, the service card utilizes the ingress identifier to send the packet back to the ingress forwarding component for purposes of performing path selection so as to maintain load balance of packet flows across the plurality of forwarding components.

Thus, the ingress forwarding component determines a next hop of a plurality of next hops to which to forward the serviced packet. The ingress forwarding component then transmits this packet to a second one of the forwarding components that interfaces with router 10D. This second one of the forwarding components acts as the egress forwarding component for this packet and may remove any internal packet headers, performs one or more operations with regard to the format of the packet, update packet headers and the like. The egress forwarding component may then forward the serviced packet to the determined next hop, i.e., router 10D in the example of FIG. 1.

In this manner, the techniques may, by potentially avoiding upgrade of service cards to perform this path selection, promote cost savings. The techniques may also promote reduced implementation complexity in comparison to both the hash operation of and in terms of upgrade of the service cards. Additionally, by enabling service cards to forgo hashing of packets to pseudo-randomly identify forwarding components that are to act as ingress forwarding components for the packet, the techniques may maintain load balancing across the forwarding components as decided by the upstream external router in accordance with WECMP. Again, while described with respect to WECMP, the techniques may generally be performed with respect to any load balancing algorithms, such as those utilized in performing link aggregation and other forms of multi-path or multi-link load balancing.

Figure 2:
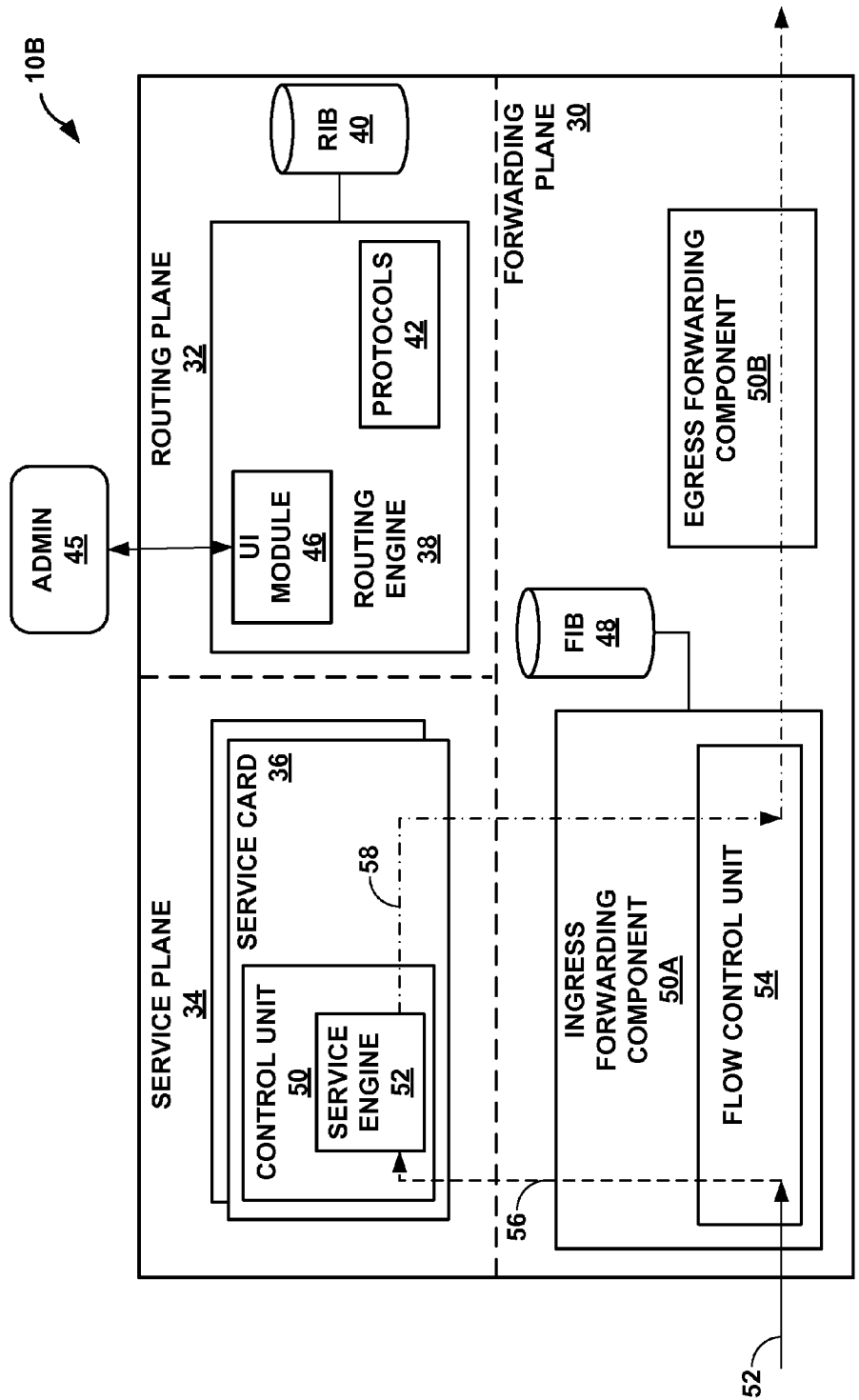
FIG. 2 is a block diagram illustrating one of the routers of FIG. 1 in more detail.

FIG. 2 is a block diagram illustrating router 10B of FIG. 1 in more detail. In the example of FIG. 2, router 10B includes a forwarding plane 30, a routing plane 32 and a service plane 34. Forwarding plane 30 may be provided by dedicated forwarding integrated circuits normally associated with high-end routing and forwarding components of a network router. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

Router 10B may integrate a routing plane 32 and a service plane 34 in a manner that utilizes shared forwarding plane 30. Forwarding plane 30 may represent a rich and dynamic shared forwarding plane, optionally distributed over a multi-chassis router. Moreover, forwarding plane 30 may be, as noted above, provided by dedicated forwarding integrated circuits normally associated with high-end routing components of a network router. Consequently, routing plane 32 and forwarding plane 30 operate as a high-end router, and service plane 36 has been tightly integrated within router 10B (e.g., by way of service cards 36) so as to use forwarding plane 30 of the routing components in a shared, cooperative manner. Further details of one example embodiment of router 10B can be found in U.S. Provisional Patent Application 61/054,692, filed May 20, 2008, entitled "STREAMLINED PACKET FORWARDING USING DYNAMIC FILTERS FOR ROUTING AND SECURITY IN A SHARED FORWARDING PLANE," which is incorporated herein by reference.

Routing plane 32 provides a routing engine 38 that is primarily responsible for maintaining a routing information base (RIB) 40 to reflect the current topology of a network and other network entities to which router 10B is connected. For example, routing engine 38 provides an operating environment for execution of routing protocols 42 that communicate with peer routers and periodically update RIB 40 to accurately reflect the topology of the network and the other network entities. Example protocols include routing and label switching protocols, such as a border gateway protocol (BGP), intermediate-systems to intermediate-system (ISIS) routing protocol, a resource reservation protocol (RSVP), a traffic engineering (TE) version of RSVP referred to as "RSVP-TE," an interior gateway protocol (IGP), link state protocols, and a label distribution protocol (LDP).

Routing engine 38 may receive this routing information via protocols 42 and update or otherwise maintain RIB 40 to reflect a current topology of network 6. This topology may provide for multiple different paths through the network to reach any given destination device. In the example of FIG. 1, two paths are shown from source devices 12 to destination device 14, which are denoted as paths 16A, 16B. Routing engine 38 may, in some instances, select one of the two paths to use to reach destination device 14.

Admin 45 may interface with routing engine 38 via a user interface (UI) module 46, which may represent a module by which a user or provisioning system may interface with routing engine 38. UI module 46 may, for example, comprise a command line interface (CLI), which may accept inputs in the form of commands and/or scripts, or a graphical user interface (GUI). Admin 45 may interface with UI module 46 to configure various components router 10B, including routing engine 38. Once configured, routing engine 38 may then resolve RIB 40 to generate forwarding information. Routing engine 38 may then interface with forwarding plane 30 to install this forwarding information into a forwarding information base (FIB) 48.

Forwarding component 50A maintains FIB 48 that associates network destinations or with specific next hops and corresponding interface ports of output interface cards of router 10B. Routing engine 38 may generate FIB 48 in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety.

When forwarding a packet, forwarding component 50A traverses the radix tree to a leaf node based on information within a header of the packet to ultimately select a next hop and output interface to which to forward the packet. Based on the selection, forwarding component may output the packet directly to the output interface or, in the case of a multi-stage switch fabric of a high-end router, may forward the packet to subsequent stages for switching to the proper output interface.

Service plane 34 represents a logical or physical plane that provides one or more services in the form of service cards 36. Service cards 36 may represent physical cards that are configured to be inserted into router 10B and coupled to forwarding plane 30 and routing plane 32 via a backplane, switch fabric or other communication medium. Typically, service cards 36 may comprise cards that couple directly to the switch fabric. Admin 45 may interface with UI module 46 to interface with routing engine 38 to specify which packet flows are to undergo service processing by one or more of service cards 36. After specifying these flows, routing engine 38 may update RIB 40 to reflect that these flows are to undergo service processing, such that when resolving FIB 48, the forwarding information may indicate that various flows are to undergo service processing. Often, this forwarding information may specify that these flows require service processing by specifying a next hop for these flows that directs packets of these flows to one of service cards 36 (where this next hop may be referred to as an "internal next hop"). Additional next hops may be specified that are external to router 10B, where the external next hop may specify, in this example, which of paths 16A,16B the packet is to be forwarded. The internal next hop may be linked to the external next hop, where in this example, router 10B may maintain two next hops (and possibly more) for any given flow.

Service cards 36 may each represent a card capable of applying one or more services. Service card 36 may include a control unit 50, which may represent one or more general processors (not shown in FIG. 1) that execute software instructions, such as those used to define a software or computer program, stored to a non-transitory computer-readable medium (again, not shown in FIG. 1), such as a storage device (e.g., a disk drive, or an optical drive), or memory (such as Flash memory, random access memory or RAM) or any other type of volatile or non-volatile memory, that stores instructions to cause the one or more processors to perform the techniques described herein. Alternatively, control unit 50 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. In some instances, control unit 50 may be referred to as a processor.

Control unit 50 may implement a service engine 52, which may represent a module or unit that applies one or more services to packets, flows of packets and/or sessions of packets (where a session refers to the combination of a flow to a destination from a source and a flow from the same destination to the same source). Service engine 52 may perform any type of service, including those listed above. For purposes of illustration, it is assumed that service engine 52 implements a service that modifies, edits or updates information in packets that is generally used in performing path selection or otherwise making forwarding decisions. Example services that modify, edit or updates this information may comprise a NAT service and a tunneling service.

In the example of FIG. 2, forwarding component 50A receives a packet 52 and, acting as an ingress forwarding component, invokes a flow control unit 54. Flow control unit 54 represents a module that selectively directs packets to service plane 34 for processing. Flow control unit 54 may access FIB 48 to determine whether packet 52 is to be sent to an internal next hop, e.g., one of service cards 36 of service plane 34, or to an external next hop via another one of forwarding components that acts as an egress forwarding component for the flow to which packet 52 corresponds, i.e., egress forwarding component 50B. While referred to as ingress forwarding component 50A and egress forwarding component 50B, each of forwarding components 50A, 50B may be the same or similar to one another in terms of underlying hardware and/or logic. That is, the ingress and egress designation of forwarding components 50A, 50B is merely to denote that forwarding component 50A acts as the ingress forwarding component for the packet flow to which packet 52 corresponds and forwarding component 50B acts as the egress forwarding component for the packet flow to which packet 52 corresponds. Moreover, forwarding plane 30 may include more than two forwarding components, where these additional forwarding components are not shown in the example of FIG. 2 for ease of illustration purposes.

In any event, flow control unit 54 may determine that packet 52 is to be transmitted to service card 36. In response to determining that packet 52 is to be transmitted to service card 36 so that service card 36 can apply a service to packet 52, flow control unit 54 of ingress forwarding component 50A may append an internal service packet header (which may also be referred to as a "service cookie"). Flow control unit 54 may specify this internal service packet header to include a field that stores an ingress identifier that identifies forwarding component 50A. Flow control unit 54 may append this internal service packet header to packet 52 to generate an updated packet 56. Flow control unit 54 may then redirect packet 52 to service card 36 of service plane 34. Service card 36 may receive this packet remove the internal service packet header, parsing the ingress identifier from the internal service packet header. Control unit 50 of service card 36 may then invoke service engine 52, which applies the service to updated packet 56, generating a serviced packet 58. Service packet 58 is assumed to differ from packet 52 in that at least one aspect of service packet 58 used when making forwarding decisions or performing path selection differs that of packet 52 (such as at least one aspect of the five-tuple of serviced packet 58 differs from the five-tuple of packet 52). In this respect, service card 36 applies the service to updated packet 56 to generate serviced packet 58 such that five tuple of serviced packet 58 is different from the five-tuple of updated packet 52.

Service card 36 may then transmit serviced packet 58 back to flow control unit 54 using the ingress identifier previously parsed from the internal service packet header so as to maintain load balancing of packet flows across forwarding components of router 10B. That is, service card 36 may actively identify the one of forwarding components 50A, 50B (and any other forwarding components not shown in the example of FIG. 2 for ease of illustration purposes) that originally received packet 52, that acts as the so-called ingress forwarding component, and/or that maintains the single point of contact for the flow to which packet 52 corresponds. As a result, service card 36 transmits serviced packet 58 to ingress forwarding component 50A identified by the ingress identifier without applying a hash function to at least a portion of serviced packet 58 to identify ingress forwarding component 50A and/or without determining a next hop of the to which to forward serviced packet 58. Moreover, service card 36 transmits serviced packet 58 to ingress forwarding component 50A such that ingress forwarding component 50A receives the packet as if the packet had been received by ingress forwarding component 50A via an interface (not shown in the example of FIG. 2) associated with ingress forwarding component 50A that couples to another network device rather than via a switch fabric coupling service card 36 to ingress forwarding component 50A. By selecting ingress forwarding component 50A, service card 36 maintains the load balancing of packet flows across the links/forwarding components (of the receiving router) decided by the upstream router in accordance with WECMP.

Flow control unit 54 receives this serviced packet 58 and accesses FIB 48 using the five-tuple of service packet 58 in order to retrieve an entry specifying a next hop for the flow to which service packet 58 corresponds. In other words, flow control unit 54 determines the next hop to which to forward serviced packet 58 based on the five-tuple of serviced packet 58 Assuming flow control unit 54 identifies a next hop that involves forwarding serviced packet 58 via an interface associated with egress forwarding component 50B, flow control unit 54 forwards this packet 58 to egress forwarding component 50B, which in turn forwards packet 58 to the next hop.

Figure 3:
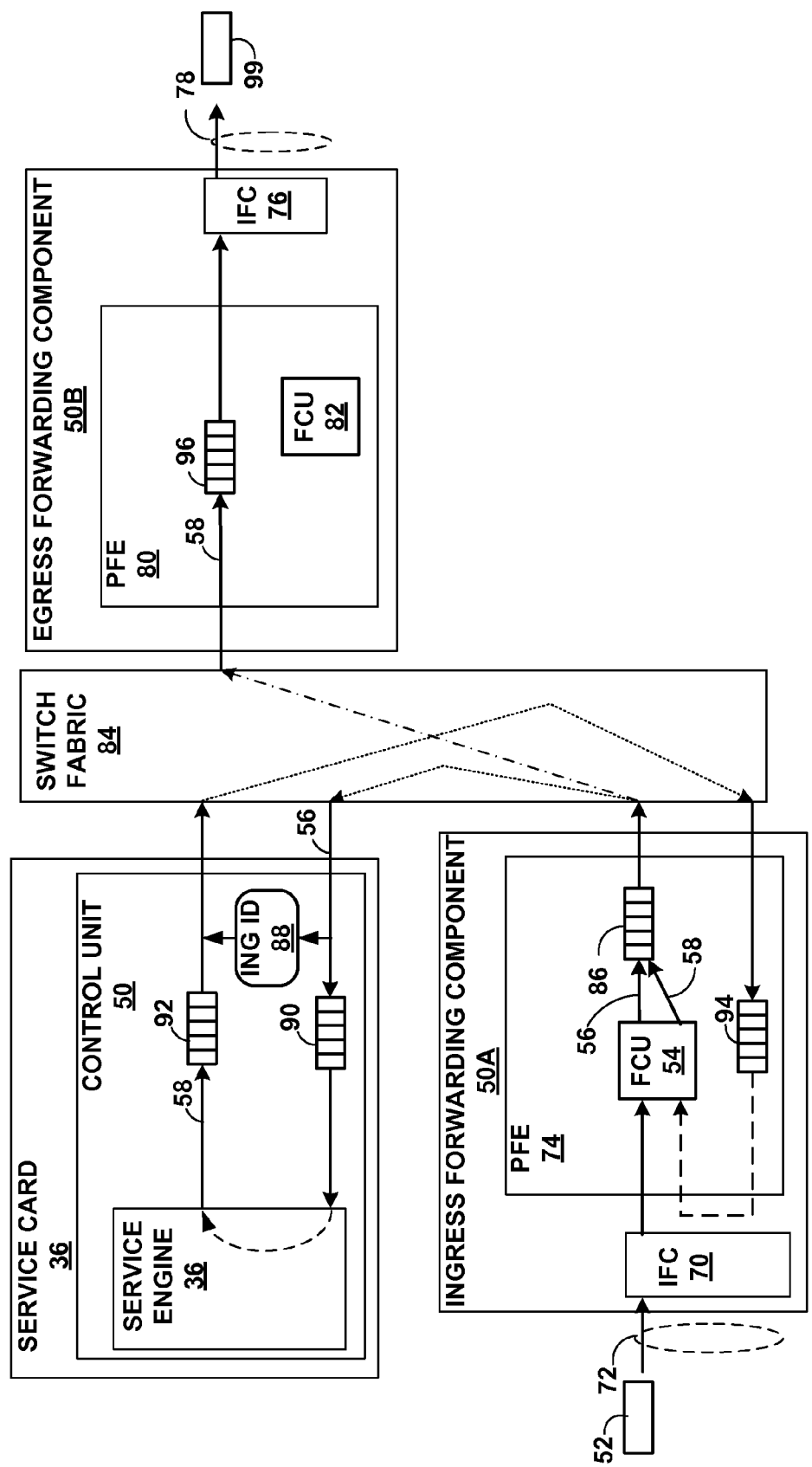
FIG. 3 is a block diagram illustrating the logical flow of packets through one of the router of FIG. 1 in accordance with the techniques described in this disclosure.

FIG. 3 is a block diagram illustrating the logical flow of packets through router 10B of FIG. 1 in accordance with the techniques described in this disclosure. The techniques will be described with respect to ingress forwarding component 50A, egress forwarding component 50B and service card 36 of router 10B, as shown in the example of FIG. 2.

In the example of FIG. 3, ingress forwarding component 50A includes an interface card (IFC) 70 having a network interface 72 and a packet forwarding engine (PFE) 74. PFE 74 includes a flow control unit 54 (shown as "FCU 54" in the example of FIG. 3). Egress forwarding component 50B also includes an IFC 76 having an interface 78 and a PFE 80. PFE 80 also includes a FCU 82, which may be similar to FCU 54.

As further shown in the example of FIG. 3, an inbound packet 52 is received from one of source devices 12 via network interface 72. FCU 54 of PFE 74 performs a route lookup on inbound packet 82 and determines that the packet must be sent over switch fabric 84 to service card 36. That is, FCU 54 performs a lookup in FIB 48 (shown in the example of FIG. 2, but not the example of FIG. 3) to determine internal next hop data identifying service card 36 as the egress interface to which the packet must be sent. FCU 54 appends a service cookie that includes a field specifying an ingress identifier 88 that identifies ingress forwarding component 50A for purposes of re-switching the packet back to ingress forwarding component 50A after having been serviced by service card 36. PFE 74 then places this updated version of packet 52 (which may be referred to as updated packet 56) within buffer 86 to be directed across switch fabric 52A to service card 36.

Control unit 50 of service card 36 receives updated packet 56 from switch fabric 84 and removes the service cookie, extracting ingress identifier 88 (shown as "ING ID 88" in the example of FIG. 3) from updated packet 56. Control unit 50 stores packet 56 to buffer 90 and invokes service engine 36, which applies the service to updated packet 56 to generate serviced packet 58. Control unit 50 places serviced packet 58 in packet buffer 92. Control unit 50 may then send serviced packet 58 using ingress identifier 88 so that PFE 74 receives serviced packet 58 as if the packet was received from an external network device that terminates at PFE 74. In some examples, ingress forwarding component 50A may include a tunnel packet interface card (PIC) that ingress forwarding component 50A may use to receive serviced packets having been serviced by service card 36 (which would appear as an outbound packet from the perspective of PFE 74) to loop back the packet to PFE 74, where the tunneled packet has a payload that encapsulates a fully-formed packet destined for the interface 76. More information regarding use of this tunnel PIC to enable ingress processing of what would otherwise be viewed as an outbound packet can be found in U.S. patent application Ser. No. 12/618,536, entitled "MULTI-ROUTER SYSTEM HAVING SHARED NETWORK INTERFACES," filed Nov. 13, 2009, the entire contents of which are hereby incorporated by reference in their entirety.

In any event, PFE 74 may receive this packet 58 from, as noted above, a tunnel PIC as an inbound packet, i.e., a packet on the PFE's network-facing inbound side as if the packet was received by router from an external tunnel. PFE 74 removes may remove a tunnel cookie from the packet and FCU 54 performs a route lookup on this "inbound" packet 58 and determines that the packet must be sent over switch fabric 84 to PFE 80 of egress forwarding component 50B to which network interface 76 is associated. That is, forwarding information accessed by FCU 54 maps keying information within packet 58 (such as the five-tuple of packet 58) to next hop data identifying network interface 76 as the egress interface to which packet 58 is to be sent. As a result, PFE 74 places packet 58 within buffer 86 to be directed across switch fabric 84 to PFE 80. PFE 80 receives packet 58 as an outbound packet from switch fabric 84 and places this outbound packet 58 within buffer 96 for output via out interface 76. IFC 76 then outputs packet 58 via interface 78 to its intended destination.

Figure 4:
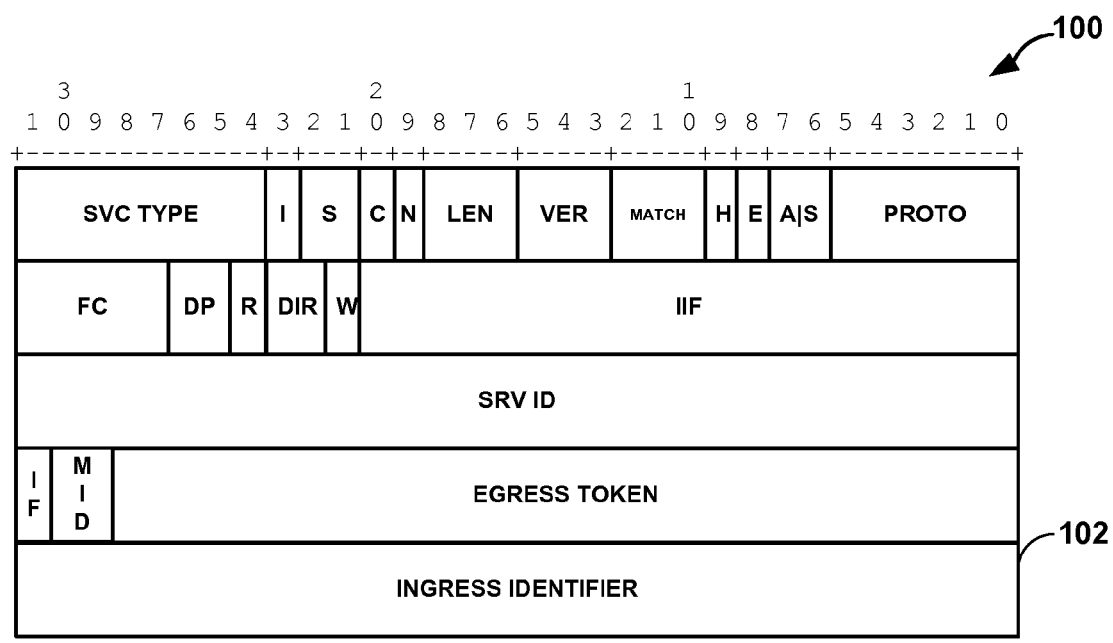
FIG. 4 is a diagram illustrating an example service cookie used in accordance with the techniques described in this disclosure to specify an ingress identifier.

FIG. 4 is a diagram illustrating an exemplary service cookie 100 used in accordance with the techniques described in this disclosure to specify an ingress identifier. In the example of FIG. 4, service cookie 100 includes a number of fields, including an service type field (shown as "SVC TYPE"), an IP field (shown as "I"), an unused field (shown as "S"), a control field (shown as "C"), a sequence field (shown as "N"), a length field (shown as "LEN"), a version field (shown as "VER"), a match field, a hash-is-present field (shown as "H"), an egress info field (shown as "E"), an application identifier present field (shown as "A"), an unused field (shown as "S"), a protocol field (shown as "PROTO"), a forwarding class field (shown as "FC"), a drop priority field (shown as "DP"), a send to routing engine (RE) field (shown as "R"), a direction field (shown as "DIR"), a new JFM cookie field (shown as "W"), an IIF field, a service identifier field, an IF field, a MID field, an egress token field, and an ingress identifier field 102. Each of the various fields specify information that is used by service card 36 to apply the appropriate services.

Ingress identifier field 102 may comprise a type-length-value (TLV) field that includes sub-fields to specify the type and length of information specified in the value sub-field. Alternatively, ingress identifier field 102 may be a set or defined length, used to specify the ingress identifier. Above service cookie 100 is a list of numbers from 31 (on the left) to 0 on the right reflecting the number of bits used to specify each field. These bit markings are provided for purposes of example and service cookie 100 may comprise more or less bits, while each field specified in service cookie 100 may comprise more or less bits than shown in the example of FIG. 4.

Figure 5:
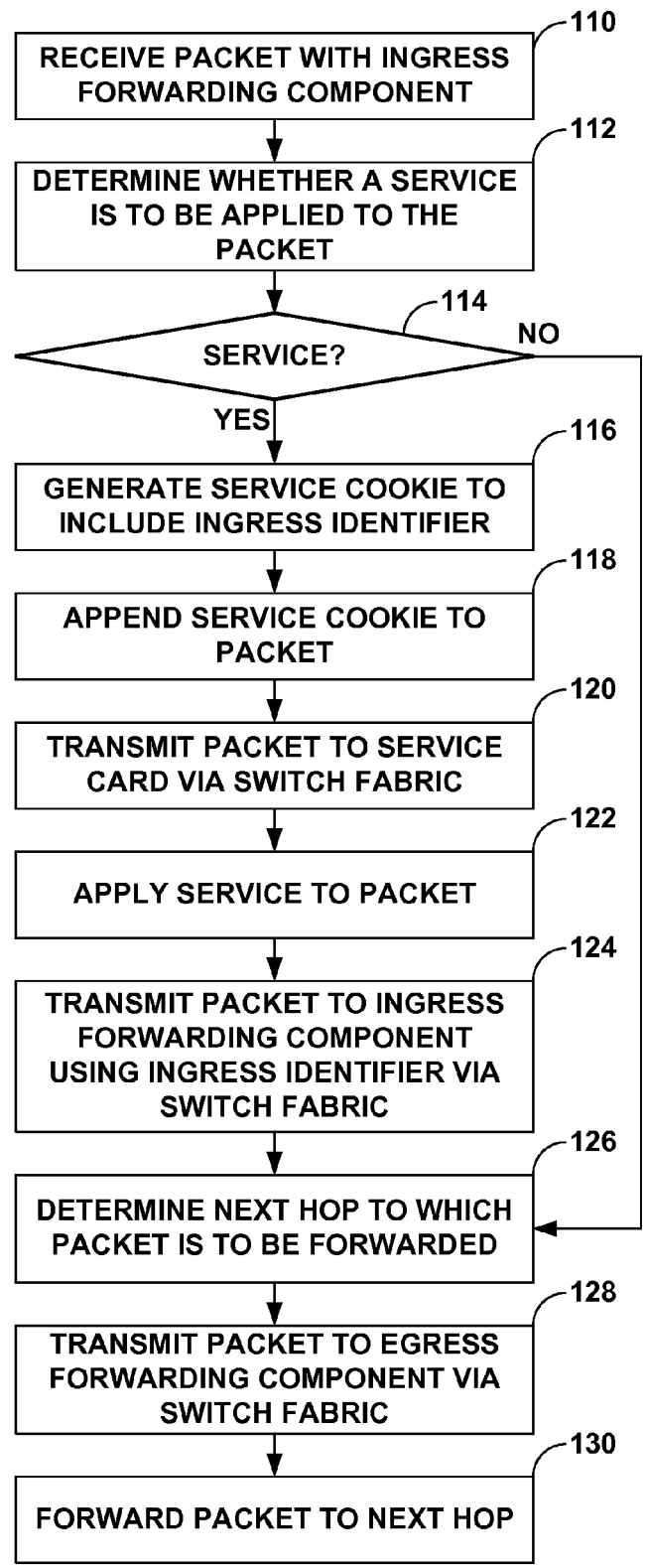
FIG. 5 is a flowchart illustrating example operation of a network device in performing the post-service application load balancing techniques described in this disclosure.

FIG. 5 is a flowchart illustrating example operation of a network device, such as router 10B shown in the examples of FIG. 1-3, in performing the post-service application load balancing techniques described in this disclosure. While described with respect to a particular device, i.e., router 10B in the example of FIG. 5, the techniques may be implemented, performed or configured to be performed by any type of network device capable of performing both load balancing and services when forwarding or otherwise switching packets or other types of data units.

Initially, forwarding component 50A (shown in the example of FIGS. 2 and 3) receives a packet 52 (110) and, acting as an ingress forwarding component, invokes a flow control unit 54. Flow control unit 54 may access FIB 48 to determine whether packet 52 is to be sent to an internal next hop, e.g., one of service cards 36 of service plane 34, or to an external next hop via another one of forwarding components that acts as an egress forwarding component for the flow to which packet 52 corresponds, i.e., egress forwarding component 50B. In this sense, flow control unit 54 may determine whether a service is to be applied to packet 52 (112). Flow control unit 54 may, in other words, determine that packet 52 is to be transmitted to service card 36.

In response to determining that a service is to be applied to packet 52 ("YES" 114), flow control unit 54 of ingress forwarding component 50A may generate an internal service packet header (which may also be referred to as a "service cookie" and is described in more detail with respect to the example of FIG. 4) that includes the ingress identifier and append this service cookie to packet 52 (116, 118). Flow control unit 54 may then redirect or otherwise transmit updated packet 56 to service card 36 of service plane 34 via switch fabric 84 (shown in the example of FIG. 3) (120). Service card 36 may receive this packet remove the internal service packet header, parsing the ingress identifier from the internal service packet header. Control unit 50 of service card 36 may then invoke service engine 52, which applies the service to updated packet 56, generating a serviced packet 58 (122). Service packet 58 is assumed to differ from packet 52 in that at least one aspect of service packet 58 used when making forwarding decisions or performing path selection differs that of packet 52 (such as at least one aspect of the five-tuple of serviced packet 58 differs from the five-tuple of packet 52). In this respect, service card 36 applies the service to updated packet 56 to generate serviced packet 58 such that five tuple of serviced packet 58 is different from the five-tuple of updated packet 52.

Service card 36 may then transmit serviced packet 58 back to flow control unit 54 using the ingress identifier previously parsed from the internal service packet header via switch fabric 84 so as to, again, maintain load balancing across the forwarding components (124). That is, service card 36 may actively identify the one of forwarding components 50A, 50B (and any other forwarding components not shown in the example of FIG. 2 for ease of illustration purposes) that originally received packet 52, that acts as the so-called ingress forwarding component for the flow to which packet 52 corresponds. As a result, service card 36 transmits serviced packet 58 to ingress forwarding component 50A identified by the ingress identifier without applying a hash function to at least a portion of serviced packet 58 to identify ingress forwarding component 50A and/or without determining a next hop of the to which to forward serviced packet 58. Moreover, service card 36 transmits serviced packet 58 to ingress forwarding component 50A such that ingress forwarding component 50A receives the packet as if the packet had been received by ingress forwarding component 50A via an interface (not shown in the example of FIG. 2) associated with ingress forwarding component 50A that couples to another network device rather than via a switch fabric coupling service card 36 to ingress forwarding component 50A.

Flow control unit 54 receives this serviced packet 58 and accesses FIB 48 using the five-tuple of service packet 58 in order to retrieve an entry specifying a next hop for the flow to which service packet 58 corresponds. In other words, flow control unit 54 determines the next hop to which to forward serviced packet 58 based on the five-tuple of serviced packet 58 (126). If flow control unit 54 originally determined that a service was not to be applied to packet 52 ("NO" 114), flow control unit 54 then determines the next hop for packet 52 in a same, if not substantially similar, manner. In any event, flow control unit 54 determines the next hop of the plurality of next hops using FIB 48. Assuming flow control unit 54 identifies a next hop that involves forwarding serviced packet 58 via an interface associated with egress forwarding component 50B, flow control unit 54 forwards this packet 58 to egress forwarding component 50B, which in turn forwards packet 58 to the next hop (128, 130).

Figure 6:
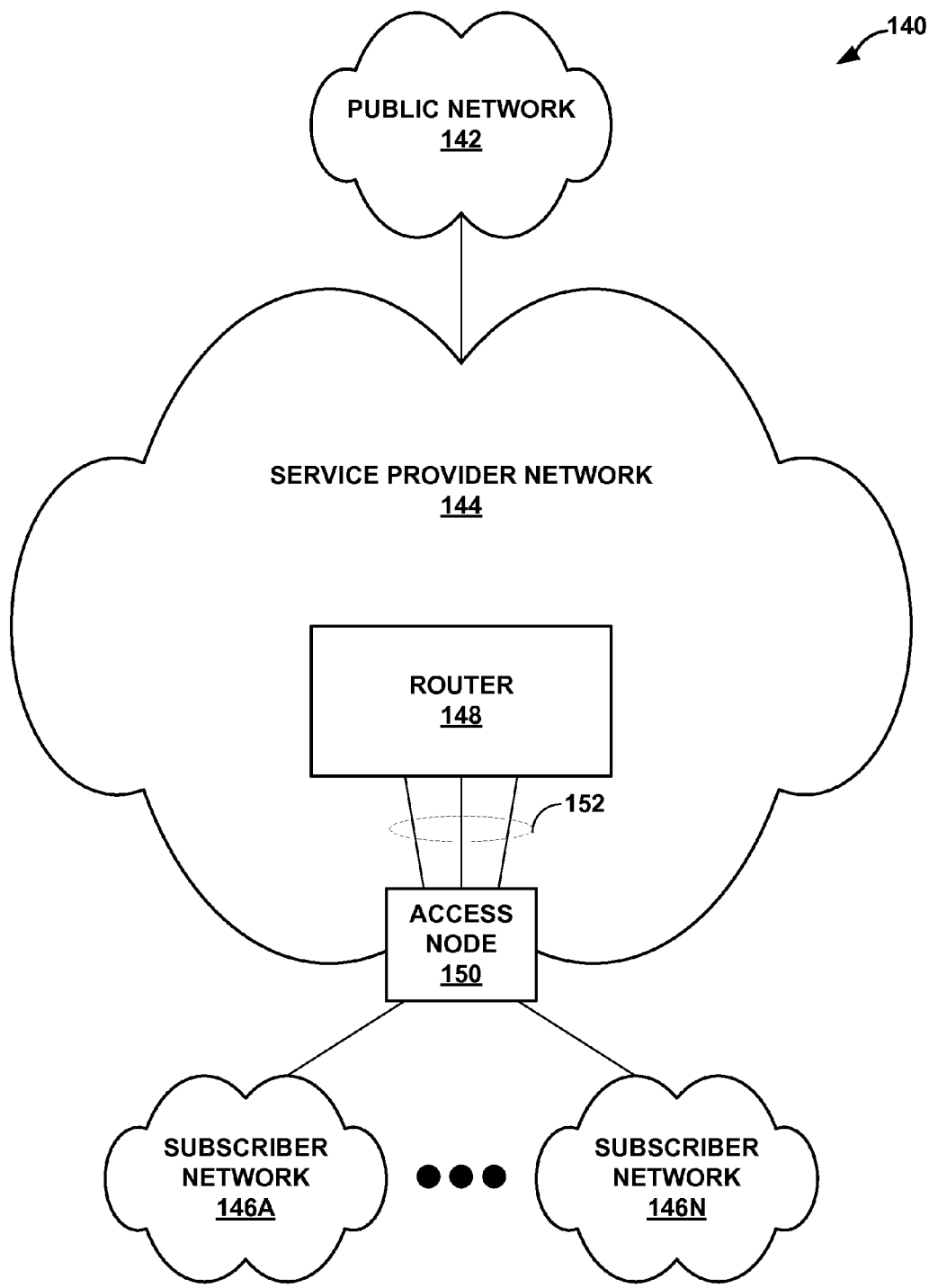
FIG. 6 is a block diagram illustrating an example network system that performs the post-service application load balancing techniques described in this disclosure in the context of an aggregated bundle of two or more links.

FIG. 6 is a block diagram illustrating an example network system 140 that performs the post-service application load balancing techniques described in this disclosure in the context of an aggregated bundle of two or more links. In the example of FIG. 6, network system 140 includes a public network 142, a service provider network 144 and a plurality of subscriber networks 146A-146N ("subscriber networks 146"). While shown as including public network 142, service provider network 144 and subscriber networks 146, network system 140 is merely one example of the type of network system in which the techniques of this disclosure may be implemented. While not shown in the example of FIG. 1, network system 140 may include additional service provider networks, subscriber networks and other types of networks, such as access networks, private networks, or any other type of network commonly employed to deliver one or more services (such as data service, Internet Protocol Television (IPTV) service, voice over Internet Protocol (VoIP) service, video telephony service or any other type of service) to subscriber networks.

Public network 142 represents a network that is generally publically accessible by any network-capable device having a network connection. Public network 142 may represent a network that is commonly referred to as the Internet, which refers to a public layer three (L3) packet-switched network (where reference to a layer followed by a number in this disclosure refers to the corresponding layer in the Open Systems Interconnection (OSI) model). Although not shown in the example of FIG. 1, public network 142 generally includes a collection of interconnected network devices, such as data servers, application servers, print servers, laptop computers, desktop computers, workstations, cellular phones (including so-called "smart phones"), routers, switches, and hubs, to name a few by way of example. Typically, while publically available, public network 142 is only accessible by network-capable devices that have an active network connection, where such network connections are commonly provided by service provider networks, such as service provider network 144 in the form of what is typically referred to as a "data service."

Service provider network 144 represents one or more networks owned and operated by a service provider (which is commonly a private entity) that offer one or more services for consumption by subscriber networks, such as subscriber networks 146. Service provider network 144 is typically a L3 packet-switched network that provides L3 connectivity between public network 142 and subscriber network 146. Often, this L3 connectivity provided by service provider network 144 is marketed as a data service or Internet service, and subscribers may subscribe to this data service. Recently, services provided by way of different types of networks from the service provider's L3 packet-switched network, such as telephone service or television service, are being provided by via the service provider's L3 packet-switched network in the form of VoIP, video on domain (VoD) and IPTV, respectively. As a result, service provider network 144 may provide what is referred to as a "triple-play package" of services that include each of data, voice and television services over the L3 packet-switched network. Thus, service provider network 144 may represent a L3 packet-switched network that provides data, voice, television and any other type of service for purchase by subscribers and subsequent consumption by subscriber networks 146.

Subscriber networks 146 each represent a network owned and operated by a subscriber of one or more of these services provided by service provider network 144. Although not shown in the example of FIG. 1 for ease of illustration purposes, subscriber networks 146 may each include one or more network-capable devices, such as network-capable printers, servers, laptop computers, desktop computers, cellular phones (including smart phones), tablet or slate computers, netbooks, personal media players, game consoles, network-capable high definition disk players (such as a Blu-ray disc player), digital video disc players, Internet-ready televisions, and electronic reading devices.

The subscribers that own and operate subscriber networks 146 may subscribe to one or more services from the service provider that owns and operates service provider network 144, where such subscriber agreements generally indicate a level of service, quality of service or class of service with which the service provider generally agrees to provide each of the one or more services. For example, one of the subscribers that owns and operates a corresponding one of subscriber networks 146 may subscriber to a data service of a particular bandwidth, such as 10 megabits per second (Mbps) usually at a class of service lower than that to which the service provider agrees to provide less latency tolerant services, such as IPTV or VoIP. In some instances, the service provider may agree to provide all services to which the subscriber subscribes at a given class of service. Whether on an individual service basis or a subscriber basis, the service provider generally agrees to provide services to which any given one of its subscribers according to an agreed upon class of service.

In order to provide these services in accordance with the agreed upon one or more classes of service, network devices of service provider network 144 that forward traffic corresponding to these services implement scheduling algorithms to schedule this subscriber traffic for delivery downstream (meaning, from public network 142 to subscriber networks 146) to subscriber networks 146 in a manner that delivers this traffic to meet the one or more classes of services associated with this subscriber. These scheduling algorithms may include a weighted fair queuing (WFQ) algorithm, however, WFQ algorithms are generally difficult to implement in that it requires substantial computations to correctly implement WFQ. Thus, the scheduling algorithms may include approximate WFQ algorithms, such as a Weighted Round-Robin (WRR) scheduling algorithm and a Deficit Round-Robin (DRR) scheduling algorithm. Alternatively, the scheduling algorithm may include the scheduling algorithm set forth in U.S. Pat. No. 7,606,154, entitled "Fair Bandwidth Allocation Based on Configurable Service Classes," filed Apr. 1, 2004, which is hereby incorporated by reference as if set forth in its entirety herein. These scheduling algorithms seek to schedule traffic in a manner that fairly allocates bandwidth to each data flow such that class of service agreements may be met while also meeting any latency requirements, which may also form a part of the class of service.

As further shown in the example of FIG. 6, service provider network 144 includes an exemplary network device shown as "router 148" and another network device shown as "access device 150." Router 148 represents any network device that routes or otherwise forwards traffic upstream from and downstream to subscriber networks 146. Typically, router 148 represents a L3 packet-switching device that operates at L3 to receive routing information describing a current topology of service provider network 144. Router 148 then processes this routing information, selecting paths through its representation of the topology of service provider network 144 to reach all available destinations to generate forwarding information. In other words, router 148 reduces these paths to so-called "next hops" which identify which of its interfaces traffic destined for a particular destination is to be forwarded, where the forwarding information includes this list of next hops. Router 148 then installs this forwarding information in a forwarding plane of router 148, whereupon the forwarding plane forwards received traffic in accordance with the forwarding information in the manner described above in more detail.

Access device 150 represents a network device that facilitates access by subscriber networks 146 to service provider network 144. Examples of access device 150 include a digital subscriber line access multiplexer (DSLAM) and a cable modem termination system (CMTS). Typically, access device 150 aggregates upstream traffic from subscriber networks 146 destined for public network 142 and de-aggregates (or de-multiplexes) aggregated downstream traffic from public network 142 destined to individual ones of subscriber networks 146. In some instances, access device 150 may duplicate some types of downstream traffic (e.g., broadcast and multicast traffic) and deliver this duplicated traffic to subscriber devices 146.

Often, service providers employ what is referred to as "aggregated bundles" to interconnect routers and access nodes via two or more links. Example aggregated bundles include aggregated Ethernet bundles, which may be configured and maintained using a link aggregation control protocol (LACP), as defined in IEEE 802.3ad, Aggregation of Multiple Link Segments, the contents of which are incorporated herein by reference. Logically, these aggregated bundles appear as a single connection to the router and/or the access node. Aggregated bundles provide a number of benefits. First, aggregated bundles may provide redundancy of connection between the routers and access nodes. To illustrate, should one of the link of the aggregated bundle fail, the router and access node interconnected by the aggregated bundle may redirect traffic previously being sent over the failed links of the aggregated bundle to one of the active links of the aggregated bundle, thereby providing redundancy of connection between a router and an access node. Second, use of aggregated bundles may provide increased network capacity (which is often measured in terms of bandwidth) considering that the multiple links of the aggregated bundle may be employed to deliver traffic rather than a single link. Third, aggregated bundles may promote bandwidth scalability in that a service provider may establish an aggregated bundle with two links, as one example, and then incrementally increase the number of links in the aggregated bundle in response to increased subscriber bandwidth demand. In this manner, the service provider may slow capital outlays by only providing sufficient bandwidth to meet current subscriber bandwidth demand rather than expected future subscriber bandwidth demand. Further exemplary details of multi-chassis link aggregation are illustrated in U.S. patent application Ser. No. 13/162,157, entitled "ACTIVE-ACTIVE MULTI-HOMING WITH MULTI-CHASSIS PSEUDOWIRE LINK AGGREGATION," hereby incorporated by reference.

While aggregated bundles may provide for improved redundancy, bandwidth and scalability, the routers and/or access node may experience difficulties in scheduling traffic to meet the class of service that the service provider have agreed to provide to its subscribers while also utilizing the increased bandwidth provided by such aggregated bundles. To illustrate, consider one deployment of aggregated bundles that allocates a (often, equal) portion of a subscriber's bandwidth that the service provider has agreed to provide a subscriber in its class of service terms to each link of the aggregated bundle. For example, if a subscriber has purchased a 12 Mbps service, the service provider may configure its router to provide ⅓ of this 12 Mpbs over each of three links of the aggregated bundle. Yet, this deployment of aggregated bundles is inadequate as the subscriber traffic flows (where a flow is commonly identified by a so-called five tuple that includes a source address, source port, destination address, destination port and a protocol) may not be evenly distributed across the links of the aggregated bundle resulting in incorrect application of class of service, such as shaping (filtering), policing, buffering, prioritized queuing, etc. Moreover, some flows may consume more bandwidth than others, such that the router may shape some flows so that they do not exceed the per-link bandwidth cap (i.e., 4 Mbps in the example above) despite that flows over the other two links are not consuming the entire 4 Mbps allocated for the corresponding subscriber on those links.

Another aggregated bundle deployment defines links as active and standby at the link (or layer two of the OSI model) level so that all active traffic flows over an aggregated bundle use half the links of the aggregated bundle. This deployment may promote more accurate shaping than in the previously discussed deployment, while also providing connection redundancy. Yet, this active/standby deployment limits bandwidth to a single link, losing the scalability and improved bandwidth aspects of using aggregated bundles.

In addition to these difficulties in taking advantage of the benefits provided by aggregated bundles while also ensuring accurate or at least reasonable class of service scheduling, in many aggregated bundle deployments, implementation of aggregated bundle in view of service application may suffer from many of the issues described above with respect to router 10B in the context of equal-cost multipath. That is, access node 150 may perform load balancing across the links of aggregated bundle 152 (which may also be referred to as a "link aggregation group" or "LAG"). Application of service may impact packets in a manner that requires forwarding decisions to be made after or post-application of the services. Yet, service cards (which may be similar to service cards 36 shown in the example of FIG. 2) of router 148 may not be equipped or configured to handle packet forwarding decisions. Typically, these service cards apply a hash to the packet five-tuple in the manner described above to redirect these packets pseudo-randomly back to one of the forwarding components.

Yet, these hash functions are only pseudo-random and the service cards may, as a result, transmit packets back to forwarding components in a manner that does not, in fact, result in an even distribution of the load across the forwarding components. Moreover, these service cards may not ensure that load that was balanced between two or more forwarding components in accordance with link aggregation protocols is maintained. Instead, these service cards may send these packets to forwarding components that are not even involved in the aggregated group of links, further distorting any attempts at balancing load across these particular forwarding components.

Accordingly, router 148 may implement the techniques desired in this disclosure to perform load balancing after application of services. Router 148 may receive a packet with a first one of a number of forwarding components that acts as an ingress forwarding component for a packet flow to which the received packet corresponds. This ingress forwarding component may determine that a service is to be applied to the packet in the manner described above. After identifying or otherwise determining that a service is to be applied to the packet, the ingress forwarding component of router 148 may then update the packet to include an ingress identifier that identifies the ingress forwarding component in response to the determination that a service is to be applied to the packet.

Once the packet is updated with the ingress identifier, the ingress forwarding component transmits the updated packet to a service card that applies the service. The service card then applies the service to the updated packet to generate a serviced packet and transmits the serviced packet to the ingress forwarding component identified by the ingress identifier so as to maintain the load at the levels load was when the packet was received and thereby potentially avoid transmitting packets to forwarding components that may already be overloaded. Thus, rather than perform a hash on the five-tuple of the packet to pseudo-randomly assign this packet to any given one of the forwarding components, the service card utilizes the ingress identifier to send the packet back to the ingress forwarding component for purposes of performing path selection.

The ingress forwarding component then determines a next hop of a plurality of next hops to which to forward the serviced packet. The ingress forwarding component then transmits this packet to a second one of the forwarding components that interfaces with the selected next hop (e.g., to an adjacent device in service provide network 144, which is not shown in the example of FIG. 6). This second one of the forwarding components acts as the egress forwarding component for this packet and may remove any internal packet headers, performs one or more operations with regard to the format of the packet, update packet headers and the like. The egress forwarding component may then forward the serviced packet to the determined next hop.

In this manner, the techniques may, by potentially avoiding the upgrade of service cards to perform this path selection, promote cost savings. The techniques may also promote reduced implementation complexity in comparison to both the hash operation of and in terms of upgrade of the service cards. Additionally, by enabling service cards to forgo hashing of packets to pseudo-randomly identify forwarding components that are to act as ingress forwarding components for the packet but that are not configured to perform path selection in accordance with load balancing algorithms, the techniques may facilitate load balancing.

The techniques of this disclosure may be implemented in a wide variety of devices or apparatuses, including a network device, an integrated circuit (IC) or a set of ICs (i.e., a chip set). Any components, modules or units have been described provided to emphasize functional aspects and does not necessarily require realization by different hardware units. The techniques described herein may also be implemented in hardware or any combination of hardware and software and/or firmware. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable storage medium comprising instructions that, when executed in a processor, performs one or more of the methods described above. The computer-readable storage medium may be a physical structure, and may form part of a computer program product, which may include packaging materials. In this sense, the computer readable medium may be non-transitory. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec.

Also, the techniques could be fully implemented in one or more circuits or logic elements.

Various embodiments of the invention have been described. These and other embodiments are within the scope of the following claims.

The invention claimed is:

1. A method comprising:
receiving a packet with a first one of a plurality of forwarding components included within a network device, wherein the first one of the plurality of forwarding components acts as an ingress forwarding component for a packet flow to which the received packet corresponds;
determining, with the ingress forwarding component, that a service is to be applied to the packet;
updating, with the ingress forwarding component, the packet to include an ingress identifier that identifies the ingress forwarding component in response to the determination that a service is to be applied to the packet;
transmitting, with the ingress forwarding component, the updated packet to a service card that applies the service;
applying, with the service card, the service to the updated packet to generate a serviced packet;
transmitting, with the service card, the serviced packet to the ingress forwarding component identified by the ingress identifier so as to maintain load balancing of packet flows across the plurality of forwarding components;
determining, with the ingress forwarding component, a next hop of a plurality of next hops to which to forward the serviced packet; and
forwarding, with a second one of the plurality of forwarding components, the serviced packet to the determined next hop, wherein the second one of the plurality of forwarding components acts as an egress forwarding component for a packet flow to which the serviced packet corresponds.

2. The method of claim 1,
wherein the packet flow to which the received packet corresponds is identified by a first five tuple that includes a source address, a source port, a destination address, a destination port and a protocol,
wherein the packet flow to which the serviced packet corresponds is identified by a second five tuple that includes a source address, a source port, a destination address, a destination port and a protocol,
wherein applying the service to the updated packet comprises applying, with the service card, the service to the updated packet to generate the serviced packet such that second five tuple is different from the first five-tuple, and
wherein determining the next hop of the plurality of next hops comprises determining the next hop of a plurality of next hops to which to forward the serviced packet based on the second five-tuple so as to distribute packet flows across the plurality of next hops.

3. The method of claim 1, wherein transmitting the serviced packet to the ingress forwarding component comprises transmitting, with the service card, the serviced packet to the ingress forwarding component identified by the ingress identifier without applying a hash function to at least a portion of the serviced packet to identify the ingress forwarding component.

4. The method of claim 1, wherein transmitting the serviced packet to the ingress forwarding component comprises transmitting, with the service card, the serviced packet to the ingress forwarding component identified by the ingress identifier without determining, with the service card, the next hop of the plurality of next hops to which to forward the serviced packet.

5. The method of claim 1, wherein transmitting the serviced packet to the ingress forwarding component comprises transmitting, with the service card, the serviced packet to the ingress forwarding component such that the ingress forwarding component receives the packet as if the packet had been received by the ingress forwarding component via an interface associated with the ingress forwarding component that couples to another network device rather than via a switch fabric coupling the service card to the ingress forwarding component.

6. The method of claim 1, wherein the ingress forwarding component and an additional one of the plurality of forwarding components receive packet flows, including the packet flow to which the packet corresponds, from an adjacent network device having been sent by the adjacent network device in accordance with an equal cost multi-path (ECMP) algorithm or a weighted ECMP (WECMP) algorithm that load balances packet the flows across two or more links coupling the network device to the adjacent network device.

7. The method of claim 1, wherein the ingress forwarding component and an additional one of the plurality of forwarding components receive packet flows, including the packet flow to which the packet corresponds, from an adjacent network device having been sent by the adjacent network device in accordance with a link aggregation algorithm that aggregates two or more links to form a single virtual link and that load balances the packet flows across the two or more links coupling the network device to the adjacent network device.

8. The method of claim 1, wherein updating the packet to include the ingress identifier comprises appending the ingress identifier to the packet.

9. The method of claim 1,
wherein updating the packet to include the ingress identifier comprises appending an internal service packet header to the packet that includes a field specifying the ingress identifier, and
wherein the method further comprises removing the internal service packet header prior to forwarding the serviced packet to the determined next hop.

10. The method of claim 1, wherein applying the service to the updated packet comprises applying one or more of a deep packet inspection service, a network address translation (NAT) service, a firewall service, a tunneling service, an anti-malware service, an anti-virus service, and an encryption service to the updated packet to generate a serviced packet.

11. A network device comprising:
a plurality of forwarding components, wherein a first one of the plurality of forwarding components receives a packet and, acting as an ingress forwarding component for a packet flow to which the received packet corresponds, determines that a service is to be applied to the packet, updates the packet to include an ingress identifier that identifies the ingress forwarding component in response to the determination that the service is to be applied to the packet and transmits the updated packet to a service card that applies the service; and
a service card that applies the service to the updated packet to generate a serviced packet and transmits the serviced packet to the ingress forwarding component identified by the ingress identifier so as to maintain load balancing of packet flows across the plurality of forwarding components, wherein the ingress forwarding component determines a next hop of a plurality of next hops to which to forward the serviced packet, and wherein a second one of the plurality of forwarding components acts an egress forwarding component for a packet flow to which the service packet corresponds and forwards the serviced packet to the determined next hop.

12. The network device of claim 11,
wherein the packet flow to which the received packet corresponds is identified by a first five tuple that includes a source address, a source port, a destination address, a destination port and a protocol,
wherein the packet flow to which the serviced packet corresponds is identified by a second five tuple that includes a source address, a source port, a destination address, a destination port and a protocol,
wherein the service card, in applying the service to the updated packet, applies the service to the updated packet to generate the serviced packet such that second five tuple is different from the first five-tuple, and
wherein the ingress forwarding component, when determining the next hop of the plurality of next hops, determines the next hop of a plurality of next hops to which to forward the serviced packet based on the second five-tuple.

13. The network device of claim 11, wherein the service card, when transmitting the serviced packet to the ingress forwarding component, transmits the serviced packet to the ingress forwarding component identified by the ingress identifier without applying a hash function to at least a portion of the serviced packet to identify the ingress forwarding component.

14. The network device of claim 11, wherein the service card, when transmitting the serviced packet to the ingress forwarding component, transmits the serviced packet to the ingress forwarding component identified by the ingress identifier without determining the next hop of the plurality of next hops to which to forward the serviced packet.

15. The network device of claim 11, wherein the service card, when transmitting the serviced packet to the ingress forwarding component, transmits the serviced packet to the ingress forwarding component such that the ingress forwarding component receives the packet as if the packet had been received by the ingress forwarding component via an interface associated with the ingress forwarding component that couples to another network device rather than via a switch fabric coupling the service card to the ingress forwarding component.

16. The network device of claim 11, wherein the ingress forwarding component and an additional one of the plurality of forwarding components receive packet flows, including the packet flow to which the packet corresponds, from an adjacent network device having been sent by the adjacent network device in accordance with an equal cost multi-path (ECMP) algorithm or a weighted ECMP (WECMP) algorithm that load balances packet the flows across two or more links coupling the network device to the adjacent network device.

17. The network device of claim 11, wherein the ingress forwarding component and an additional one of the plurality of forwarding components receive packet flows, including the packet flow to which the packet corresponds, from an adjacent network device having been sent by the adjacent network device in accordance with a link aggregation algorithm that aggregates two or more links to form a single virtual link and that load balances the packet flows across the two or more links coupling the network device to the adjacent network device.

18. The network device of claim 11, wherein the ingress forwarding component, when updating the packet to include the ingress identifier, appends the ingress identifier to the packet.

19. The network device of claim 11,
wherein the ingress forwarding component, when updating the packet to include the ingress identifier, appends an internal service packet header to the packet that includes a field specifying the ingress identifier, and
wherein either the ingress forwarding component further removes the internal service packet header prior to forwarding the serviced packet to the determined next hop.

20. The network device of claim 11, wherein the service card, when applying the service to the updated packet, applies one or more of a deep packet inspection service, a network address translation (NAT) service, a firewall service, a tunneling service, an anti-malware service, an anti-virus service, and an encryption service to the updated packet to generate a serviced packet.

21. A service card configured to be inserted into a network device and couple to a plurality of forwarding components of the network device, the service card comprising:
a control unit that receives a packet from a first one of the plurality of forwarding components acting as an ingress forwarding component for a packet flow to which the packet corresponds, wherein the packet includes an internal service packet header that includes a field specifying an ingress identifier that identifies the ingress forwarding component, and
wherein the control unit executes a service engine that applies a service to the updated packet to generate a serviced packet,
wherein the control unit further transmits the serviced packet to the ingress forwarding component identified by the ingress identifier so as to maintain load balancing of packet flows across the plurality of forwarding components.

22. The service card of claim 21,
wherein the packet flow to which the received packet corresponds is identified by a first five tuple that includes a source address, a source port, a destination address, a destination port and a protocol,
wherein the packet flow to which the serviced packet corresponds is identified by a second five tuple that includes a source address, a source port, a destination address, a destination port and a protocol, and
wherein, when applying the service to the updated packet, the service engine applies the service to the updated packet to generate the serviced packet such that second five tuple is different from the first five-tuple.

23. The service card of claim 21, wherein the control unit transmits the serviced packet to the ingress forwarding component identified by the ingress identifier without applying a hash function to at least a portion of the packet to identify the ingress forwarding component.

24. The service card of claim 21, wherein the control unit transmits the serviced packet to the ingress forwarding component identified by the ingress identifier without determining, with the service card, the next hop of the plurality of next hops to which to forward the serviced packet.

25. The service card of claim 21, wherein the control unit transmits the service packet to the ingress forwarding component such that the ingress forwarding component receives the packet as if the packet had been received by the ingress forwarding component via an interface associated with the ingress forwarding component that couples to another network device rather than via a switch fabric coupling the service card to the ingress forwarding component.

* * * * *